United States Patent
Shimada et al.

(10) Patent No.: US 8,745,980 B2
(45) Date of Patent: Jun. 10, 2014

(54) VEHICLE CONTROL DEVICE

(75) Inventors: Hiroshi Shimada, Mishima (JP); Michihito Shimada, Mishima (JP); Masashi Takagi, Nagoya (JP); Motonari Ohbayashi, Susono (JP); Shinya Kodama, Toyota (JP); Akihiro Kida, Toyota (JP); Akito Onishi, Nagoya (JP); Toshiya Oishi, Nagoya (JP); Takamasa Kitamura, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/980,185

(22) PCT Filed: Jan. 18, 2011

(86) PCT No.: PCT/JP2011/050747
§ 371 (c)(1),
(2), (4) Date: Sep. 20, 2013

(87) PCT Pub. No.: WO2012/098642
PCT Pub. Date: Jul. 26, 2012

(65) Prior Publication Data
US 2014/0007573 A1 Jan. 9, 2014

(51) Int. Cl.
*F02D 29/02* (2006.01)
(52) U.S. Cl.
USPC ............................................ 60/397; 123/325
(58) Field of Classification Search
CPC ....... B60T 13/52; B60T 13/565; B60T 13/72; B60T 2220/04; F02D 41/123
USPC ....... 60/397, 545; 123/198 DB, 325; 303/155
See application file for complete search history.

(56) References Cited

U.S. PATENT DOCUMENTS

| 5,016,587 | A | | 5/1991 | Berger et al. |
| 5,091,857 | A | * | 2/1992 | Katayama et al. ............ 123/325 |
| 5,918,462 | A | * | 7/1999 | Mitani ............................. 60/397 |
| 6,244,676 | B1 | * | 6/2001 | Watanabe et al. ............... 60/397 |
| 6,367,893 | B1 | * | 4/2002 | Mizutani et al. ................ 60/545 |
| 6,536,850 | B2 | * | 3/2003 | Almkvist et al. ............. 303/155 |
| 7,040,719 | B2 | * | 5/2006 | Collins et al. .............. 303/114.3 |
| 8,267,072 | B2 | * | 9/2012 | Pursifull ......................... 60/397 |
| 2010/0036566 | A1 | | 2/2010 | Hayami |
| 2010/0222980 | A1 | * | 9/2010 | Berr ................................. 701/77 |

FOREIGN PATENT DOCUMENTS

| JP | U-01-098059 | 6/1989 |
| JP | A-02-503894 | 11/1990 |
| JP | A-2010-038051 | 2/2010 |
| JP | A-2012-097621 | 5/2012 |

* cited by examiner

*Primary Examiner* — Thomas E Lazo
(74) *Attorney, Agent, or Firm* — Oliff PLC (57) ABSTRACT

A vehicle control device, that controls to suppress a driving force of a vehicle based on an operation of a brake pedal operated when a braking force is generated by a braking device, wherein the brake pedal is connected to a brake booster, that increases an operating force input to the brake pedal by using a brake negative pressure to transmit to brake fluid of the braking device in order to appropriately control by appropriately detecting the operation of the brake pedal; and the driving force is suppressed according to an M/C pressure when the brake negative pressure is higher than a brake negative pressure threshold value, and the driving force is suppressed according to an operation state of the brake pedal when the brake negative pressure is equal to or lower than the brake negative pressure threshold value.

4 Claims, 5 Drawing Sheets

VEHICLE CONTROL DEVICE

FIELD

The present invention relates to a vehicle control device.

BACKGROUND

A vehicle control device, which performs various pieces of control during travel of a vehicle controls also safety when controlling the travel of the vehicle according to drive operation of a driver. For example, a circuit of a brake stop lump for vehicle including an electronic diesel control device disclosed in Patent Literature 1 is provided with two switches, which detect operation of a brake pedal, and according to this, this can avoid malfunction in a case in which an accelerator pedal and the brake pedal are depressed at the same time.

CITATION LIST

Patent Literature

Patent Literature 1: Japanese translation of PCT international application No. H02-503894

SUMMARY

Technical Problem

However, the switch of the brake stop lump is turned ON at an initial stage of the operation of the brake pedal, so that the switch of the brake stop lump is turned ON even when slight operation is performed on the brake pedal. Therefore, the switch of the brake stop lump is turned ON when the slight operation is performed on the brake pedal such that rapid deceleration in the event of emergency may be performed in consideration of the safety during the travel while the accelerator pedal is operated in the vehicle, which controls to suppress a driving force when the accelerator pedal and the brake pedal are depressed at the same time, so that the driving force is suppressed. That is to say, when the operation of the brake pedal is judged based on the switch of the brake stop lump, deceleration control might intervene even when the driver does not have intention to decelerate.

Therefore, in such vehicle, which controls to suppress the driving force when the accelerator pedal and the brake pedal are depressed at the same time, the operation of the brake pedal might be judged based on a master cylinder pressure, which becomes higher when the brake pedal is surely depressed. However, the brake pedal is normally connected to a brake booster, which increases an operating force to the brake pedal by using the negative pressure, so that the master cylinder pressure might be less likely to be higher even when the brake pedal is operated when the negative pressure becomes lower. In this manner, there is a room for improvement in an aspect to detect the operation of the brake pedal.

The present invention is achieved in view of the above-description and an object thereof is to provide the vehicle control device, which is untroublesome for the driver, by appropriate control at the time when the driving force is suppressed based on the operation of the brake pedal.

Solution to Problem

In order to solve the above mentioned problem and achieve the object, in a vehicle control device according to the present invention, that controls to suppress a driving force of a vehicle based on an operation of a brake pedal operated when a braking force is generated by a braking device, the brake pedal is connected to a brake servo unit, that increases an operating force input to the brake pedal by using a negative pressure to transmit the operating force to an operating fluid side of the braking device, and the driving force is suppressed according to a fluid pressure of the operating fluid when the negative pressure is higher than a predetermined judgment value, and the driving force is suppressed according to an operation state of the brake pedal when the negative pressure is not higher than the judgment value.

In order to solve the above mentioned problem and achieve the object, in a vehicle control device according to the present invention, that controls to suppress a driving force of a vehicle based on an operation of a brake pedal operated when a braking force is generated by a braking device, the brake pedal is connected to a brake servo unit, that increases an operating force input to the brake pedal by using a negative pressure to transmit the operating force to an operating fluid side of the braking device, and an influence degree of a fluid pressure of the operating fluid with respect to control of the driving force is changed according to the negative pressure.

Further, in the vehicle control device, it is preferable that the influence degree of the fluid pressure with respect to the suppression of the driving force is changed according to the negative pressure when the driving force is suppressed according to the fluid pressure.

Further, in the vehicle control device, it is preferable that the control to suppress the driving force is performed when both an accelerator pedal, operated when the driving force is adjusted, and the brake pedal are operated.

Advantageous Effects of Invention

The vehicle control device according to the present invention has an effect that it is possible to perform the untroublesome control for the driver by appropriately controlling when suppressing the driving force based on the operation of the brake pedal.

DESCRIPTION OF EMBODIMENTS

Figure 1:
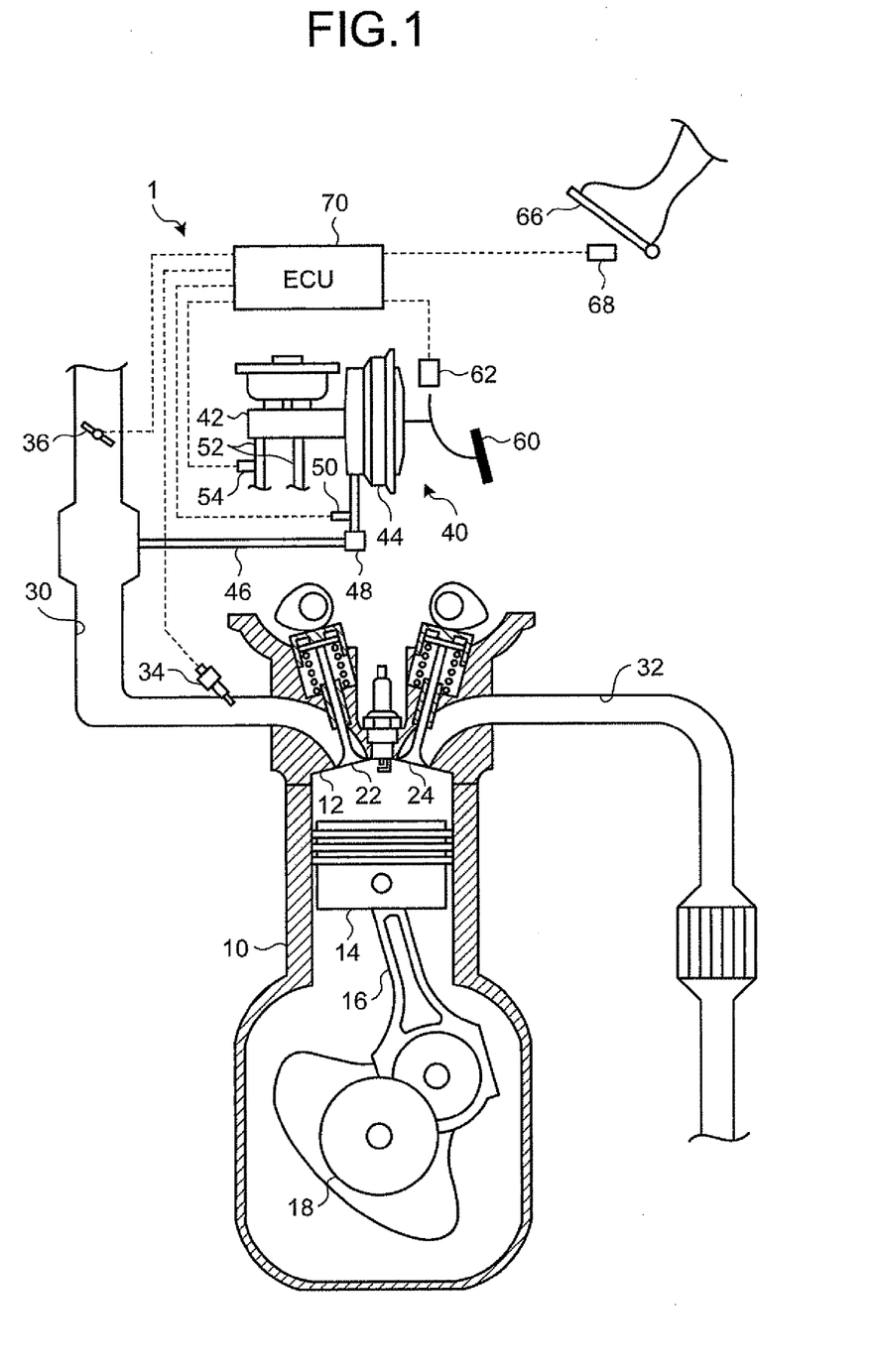
FIG. 1 is a schematic diagram illustrating a configuration of a vehicle control device according to an embodiment.

An embodiment of a vehicle control device according to the present invention is hereinafter described in detail with reference to the drawings. Meanwhile, the present invention is not limited by the embodiment. The embodiment to be described includes a component easily replaced by one skilled in the art or a substantially identical component.
Embodiment FIG. 1 is a schematic diagram illustrating a configuration of a vehicle control device according to an embodiment. A vehicle control device 1 illustrated in this drawing is provided on a vehicle (not illustrated) and the vehicle is equipped with an engine 10 being an internal combustion engine as a power source during travel. The engine 10 is provided with a piston 14, which is connected to a crankshaft 18 by means of a connecting rod 16 and reciprocates, inside thereof and a combustion chamber 12 is provided on a side of a top dead point of the piston 14. An intake passage 30 and an exhaust passage 32 are connected to the combustion chamber 12, and an opening portion between the combustion chamber 12 and the intake passage 30 is formed to be openable/closable by an intake valve 22 and an opening portion between the combustion chamber 12 and the exhaust passage 32 is formed to be openable/closable by an exhaust valve 24.

A fuel injector 34, which injects fuel into the intake passage 30, is provided on the intake passage 30 and a throttle valve 36 capable of opening and closing the intake passage 30 is provided upstream of the fuel injector 34 in a flow direction of air flowing in the intake passage 30.

The vehicle is also provided with a braking device 40, which generates a braking force. The braking device 40 includes a master cylinder 42, which generates a fluid pressure, that is to say, a hydraulic pressure in brake fluid as an operating fluid according to an operating force at the time when a brake pedal 60 is operated, and a hydraulic pressure path 52 to transmit the hydraulic pressure generated in the brake fluid by the brake fluid flowing inside thereof is connected to the master cylinder 42. A wheel cylinder (not illustrated) provided in the vicinity of a wheel (not illustrated) is connected to the hydraulic pressure path 52 and the wheel cylinder is operated by the hydraulic pressure transmitted by the hydraulic pressure path 52. According to this, the braking device 40 can generate the braking force. A master cylinder pressure sensor 54, which detects the hydraulic pressure of the brake fluid in the hydraulic pressure path 52, is connected to the hydraulic pressure path 52.

A brake booster 44 being a brake servo unit, which increases the operating force at the time when the brake pedal 60 is operated to transmit to the master cylinder 42, is connected to the master cylinder 42 and the brake pedal 60 is connected to the brake booster 44 so as to be able to input the operating force to the brake booster 44. That is to say, the brake booster 44 is interposed between the brake pedal 60 and the master cylinder 42 in a flow direction of the force input to the brake pedal 60.

One end of a negative pressure path 46 is connected to the brake booster 44. The other end of the negative pressure path 46 is connected to a portion between a portion connected to the combustion chamber 12 of the intake passage 30 and the throttle valve 36. When the engine 10 is operated, the air in the intake passage 30 is sucked into the combustion chamber 12, so that a pressure in the intake passage 30 becomes a negative pressure; this negative pressure is transmitted also to the brake booster 44 through the negative pressure path 46. That is to say, the negative pressure path 46 is provided as the path to transmit the negative pressure in the intake passage 30 to the brake booster 44. The brake booster 44 increases the operating force input to the brake pedal 60 by using the negative pressure transmitted through the negative pressure path 46 in this manner and transmits the same to the master cylinder 42, thereby transmitting the increased operating force to the brake fluid side.

A negative pressure path check valve 48, which regulates a flow direction of the air in the brake booster 44 by regulating the air flowing in a direction toward the brake booster 44, is provided on the negative pressure path 46 provided between the intake passage 30 and the brake booster 44 in this manner. Further, a negative pressure sensor 50, which detects the negative pressure in the negative pressure path 46, is provided on the negative pressure path 46. A brake switch 62 being the switch, which detects that the brake pedal 60 is depressed when the brake pedal 60 is depressed to light a stop lump (not illustrated) provided on a rear part of the vehicle, is provided in the vicinity of the brake pedal 60.

The brake switch 62 and the like provided in this manner are mounted on the vehicle to be connected to an ECU (Electronic Control Unit) 70, which controls each part of the vehicle. That is to say, detecting means such as the negative pressure sensor 50, the master cylinder pressure sensor 54, and the brake switch 62 are provided so as to be connected to the ECU 70 capable of detecting a travel state of the vehicle and a state of drive operation of a driver and to transmit the same to the ECU 70. Devices such as the fuel injector 34 and the throttle valve 36 also are provided so as to be connected to the ECU 70 and controllable by the ECU 70. An accelerator opening degree sensor 68, which detects an accelerator opening degree being an operation amount of an accelerator pedal 66 used for adjusting an output of the engine 10 and a driving force during the travel of the vehicle, is also connected to the ECU 70 provided in this manner.

Figure 2:
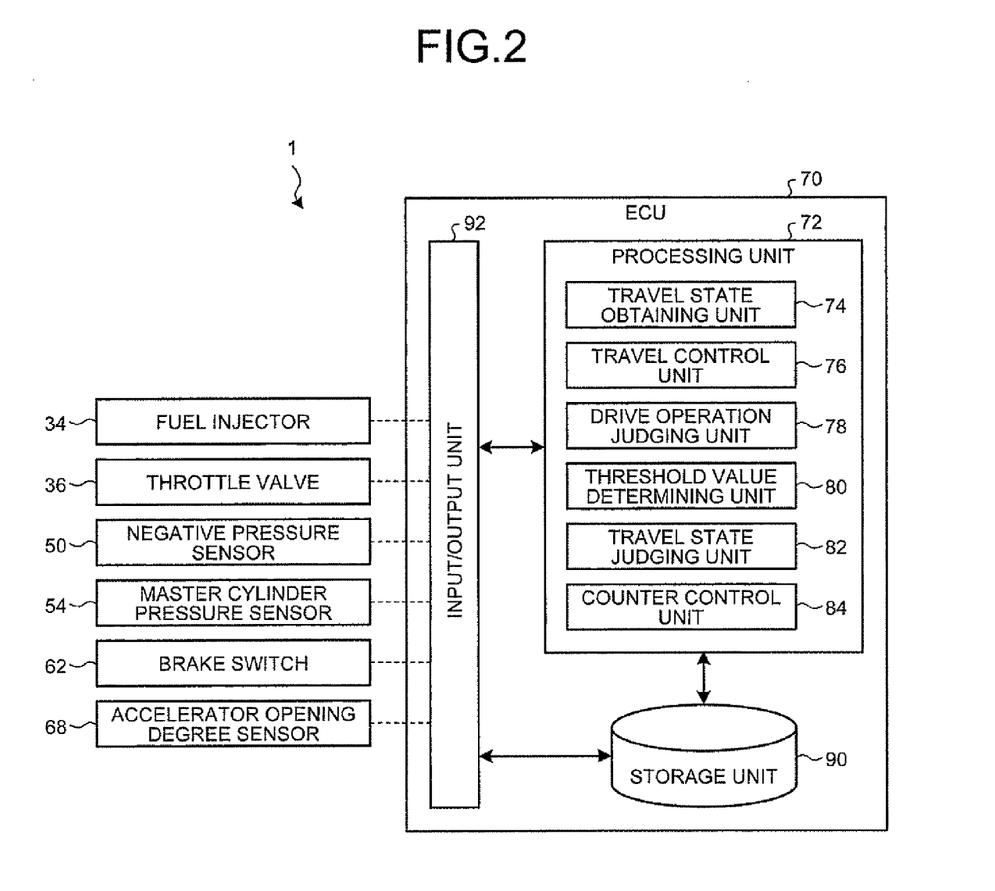
FIG. 2 is a configuration diagram of a substantial part of the vehicle control device illustrated in FIG. 1.

FIG. 2 is a configuration diagram of a substantial part of the vehicle control device illustrated in FIG. 1. The ECU 70 is provided with a processing unit 72 including a CPU (Central Processing Unit) and the like, a storage unit 90 such as a RAM (Random Access Memory), and an input/output unit 92; they are connected to each other so as to be able to pass a signal to each other. The sensors such as the negative pressure sensor 50, the master cylinder pressure sensor 54, the brake switch 62, and the accelerator opening degree sensor 68 and the devices such as the fuel injector 34 and the throttle valve 36 connected to the ECU 70 are connected to the input/output unit 92, and the input/output unit 92 inputs/outputs the signal to/from the negative pressure sensor 50 and the like. A computer program, which controls the vehicle, is stored in the storage unit 90.

The processing unit 72 of the ECU 70 provided in this manner includes a travel state obtaining unit 74, which obtains the travel state of the vehicle and the state of the drive operation of the driver, a travel control unit 76, which controls the travel of the vehicle, a drive operation judging unit 78, which judges the state of the drive operation of the driver, a threshold value determining unit 80, which determines a threshold value of a master cylinder pressure according to the negative pressure, which can be used by the brake booster 44, when it is judged whether the driving force is suppressed according to the master cylinder pressure, a travel state judging unit 82, which makes various judgments based on the travel state of the vehicle and the state of the drive operation of the driver, and a counter control unit 84, which controls a counter provided on the processing unit 72.

When the ECU 70 controls the vehicle, for example, the processing unit 72 loads the above-described computer program into a memory incorporated in the processing unit 72 to perform an operation based on a detection result of the accelerator opening degree sensor 68 and the like, and allows the throttle valve 36 and the like to operate according to a result of the operation, thereby controlling. At that time, the processing unit 72 appropriately stores a value now being operated in the storage unit 90 and takes out the stored value to execute the operation.

The vehicle control device 1 according to this embodiment is configured as described above, and a function thereof is hereinafter described. During the travel of the vehicle provided with the vehicle control device 1, the detecting means such as the accelerator opening degree sensor 68 detects the drive operation state of the driver such as the operation amount of the accelerator pedal 66 and the travel state obtaining unit 74 included in the processing unit 72 of the ECU 70 obtains the detection result. The state of the drive operation and the like obtained by the travel state obtaining unit 74 is transmitted to the travel control unit 76 included in the processing unit 72 of the ECU 70.

The travel control unit 76 controls the travel of the vehicle based on the state of the drive operation and the like obtained by the travel state obtaining unit 74. When the travel of the vehicle is controlled, each part of the engine 10 such as an opening degree of the throttle valve 36 and an injection amount of the fuel injected by the fuel injector 34 is controlled according to the travel state and the like transmitted from the travel state obtaining unit 74 to allow the engine 10 to generate desired power. The power generated in this manner is transmitted to a drive wheel (not illustrated) through a power communication route such as a transmission (not illustrated) to generate the driving force on the drive wheel.

During the travel of the vehicle, not only the driving force but also the braking force is generated to adjust a vehicle speed; the driver operates the brake pedal 60 when generating the braking force on the vehicle. Specifically, it is configured to input the operating force by applying a pedal force to the brake pedal 60 and allow the braking device 40 to generate the braking force by the operating force; when the operating force is input to the brake pedal 60, the input operating force is increased by the brake booster 44 to generate the braking force.

In detail, when the braking force is generated by the braking device 40, the master cylinder 42 generates the hydraulic pressure in the brake fluid in the hydraulic pressure path 52 based on the operating force at the time when the brake pedal 60 is operated and the wheel cylinder is operated by the hydraulic pressure to generate the braking force. The brake booster 44, which is connected to the intake passage 30 by means of the negative pressure path 46, increases the operating force at the time when the brake pedal 60 is operated by using the negative pressure generated in the intake passage 30 at the time of the operation of the engine 10 to transmit to the master cylinder 42. That is to say, the brake booster 44 increases the operating force by using a brake negative pressure being the negative pressure, which may be used by the brake booster 44, and transmits the operating force increased in this manner to the master cylinder 42. The master cylinder 42 generates the hydraulic pressure according to the operating force increased by the brake booster 44 in this manner in the brake fluid in the hydraulic pressure path 52. According to this, the braking device 40 generates the braking force.

When the drive operation to generate the driving force and the braking force at the same time by depressing the accelerator pedal 66 and the brake pedal 60 at the same time is performed, the vehicle control device 1 performs driving force suppression control to suppress the driving force. Specifically, when the engine 10 is allowed to generate the power according to the accelerator opening degree, thereby generating the driving force by the depression of the accelerator pedal 66, the driving force is suppressed when the master cylinder pressure (M/C pressure) being the hydraulic pressure of the brake fluid in the hydraulic pressure path 52, which increases when the brake pedal 60 is depressed, becomes higher than a predetermined value. According to this, when the accelerator pedal 66 and the brake pedal 60 are depressed at the same time, the driving force is suppressed.

Herein, the braking device 40 increases the M/C pressure by increasing the operating force at the time when the brake pedal 60 is operated by the brake booster 44; the brake booster 44 is connected to the portion between the portion connected to the combustion chamber 12 of the intake passage 30 and the throttle valve 36 by means of the negative pressure path 46.

In a case in which the engine 10 is allowed to generate the power by the depression of the accelerator pedal 66, the throttle valve 36 is opened, so that a large amount of air flows downstream of the throttle valve 36 in the intake passage 30. Therefore, the air also flows into the negative pressure path 46 and the negative pressure decreases, so that the brake negative pressure used when the operating force to the brake pedal 60 is increased by the brake booster 44 to be transmitted to the master cylinder 42 decreases.

According to this, the M/C pressure is less likely to be increased, so that the M/C pressure with respect to the operating force of the brake pedal 60 at the time when the brake pedal 60 is depressed together with the accelerator pedal 66 is less likely to be increased as compared to the M/C pressure with respect to the operating force of the brake pedal 60 at the time when only the brake pedal 60 is depressed without the accelerator pedal 66 depressed. In this case, the M/C pressure is less likely to be higher than a predetermined value used for judgment whether to perform the driving force suppression control, and there is a case in which the control to suppress the driving force is hardly performed when a threshold value of whether to perform the driving force suppression control is made constant. Therefore, in the vehicle control device 1 according to this embodiment, the threshold value used when it is judged whether the driving force suppression control is performed based on the M/C pressure is changed according to the brake negative pressure.

Figure 3:
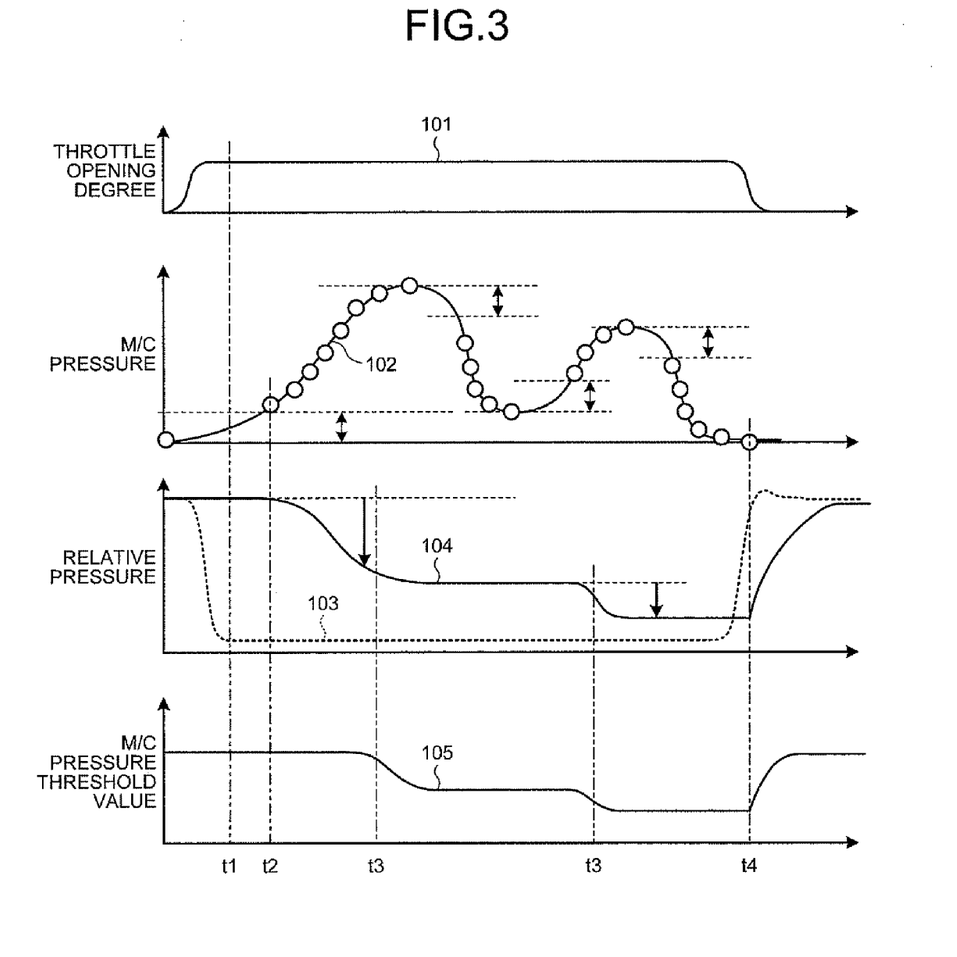
FIG. 3 is an illustrative diagram of a case in which a threshold value of an M/C pressure is changed according to a brake negative pressure.

FIG. 3 is an illustrative diagram of a case in which the threshold value of the M/C pressure is changed according to the brake negative pressure. If the accelerator pedal 66 and the brake pedal 60 are depressed at the same time, when the accelerator opening degree with which the accelerator pedal 66 is operated is made larger, a throttle opening degree 101 being the opening degree of the throttle valve 36 becomes larger. When the throttle opening degree 101 becomes larger in this manner, an intake pipe pressure 103 being the pressure in the intake passage 30 decreases (FIG. 3, t1). That is to say, since the intake pipe pressure 103 is the pressure satisfying a relationship of (intake pipe pressure 103=intake pipe absolute pressure−atmospheric pressure), this is the negative pressure with respect to the atmospheric pressure, but the intake pipe absolute pressure becomes higher as the throttle opening degree 101 is made larger and a difference between the same and the atmospheric pressure becomes smaller, so that the intake pipe pressure 103 becomes lower when an absolute value of the pressure is taken into consideration.

Even when the throttle opening degree 101 becomes larger by the depression of the accelerator pedal 66 in this manner, if a state in which the brake pedal 60 is depressed is maintained, an M/C pressure 102 increases. Although the M/C pressure 102 increases by the operating force to the brake pedal 60, the operating force at the time when the brake pedal 60 is operated increases by usage of a brake negative pressure 104 by the brake booster 44 to be transmitted to the master cylinder 42.

Although the master cylinder 42 generates the M/C pressure 102 by the force increased by the brake negative pressure 104 in this manner, when the brake booster 44 increases the operating force of the brake pedal 60 by using the brake negative pressure 104, the brake negative pressure 104 is consumed when the brake pedal 60 is switched ON/OFF. Therefore, when the brake pedal 60 is pumped, the brake negative pressure 104 is easily consumed. That is to say, the brake negative pressure 104 satisfying a relationship of (brake negative pressure 104=absolute pressure of brake booster 44−atmospheric pressure) drastically decreases when the brake pedal 60 is pumped (FIG. 3, t2).

When the brake negative pressure 104 decreases in this manner, the operating force input to the brake pedal 60 is less likely to be increased when this is increased by the brake booster 44, and the M/C pressure 102 might be decreased according to this. That is to say, when the brake negative pressure 104 decreases, the M/C pressure 102 with respect to the operating force input to the brake pedal 60 becomes lower.

When the M/C pressure 102 with respect to the operating force to the brake pedal 60 becomes lower, the M/C pressure 102 is less likely to be higher than an M/C pressure threshold value 105 being the threshold value used when it is judged whether the driving force suppression control is performed, so that the M/C pressure threshold value 105 is made lower in this case (FIG. 3, t3). That is to say, the M/C pressure threshold value 105 is changed according to the brake negative pressure 104 and as the brake negative pressure 104 becomes lower, the M/C pressure threshold value 105 also is made, lower. When the driving force is suppressed according to the M/C pressure 102, an influence degree of the M/C pressure 102 on the suppression of the driving force is changed according to the brake negative pressure 104 by changing the M/C pressure threshold value 105 according to the brake negative pressure 104 in this manner.

When the brake negative pressure 104 further decreases, so that the brake booster 44 scarcely boosts, the M/C pressure 102 is less likely to increase even when the operating force is input to the brake pedal 60 (FIG. 3, t4). In such a case, the driving force is suppressed based on the brake switch 62, which is switched ON/OFF when the brake pedal 60 is operated. That is to say, when the brake switch 62 detects that the brake pedal 60 is depressed, the driving force is suppressed. When the brake negative pressure 104 decreases to be equal to or lower than a predetermined value in this manner, the driving force is suppressed according to the operation state of the brake pedal 60.

The vehicle control device 1 of this embodiment changes a criterion for suppressing the driving force at the time of the driving force suppression control in a case in which the accelerator pedal 66 and the brake pedal 60 are depressed at the same time according to magnitude of the brake negative pressure 104.

Figure 4:
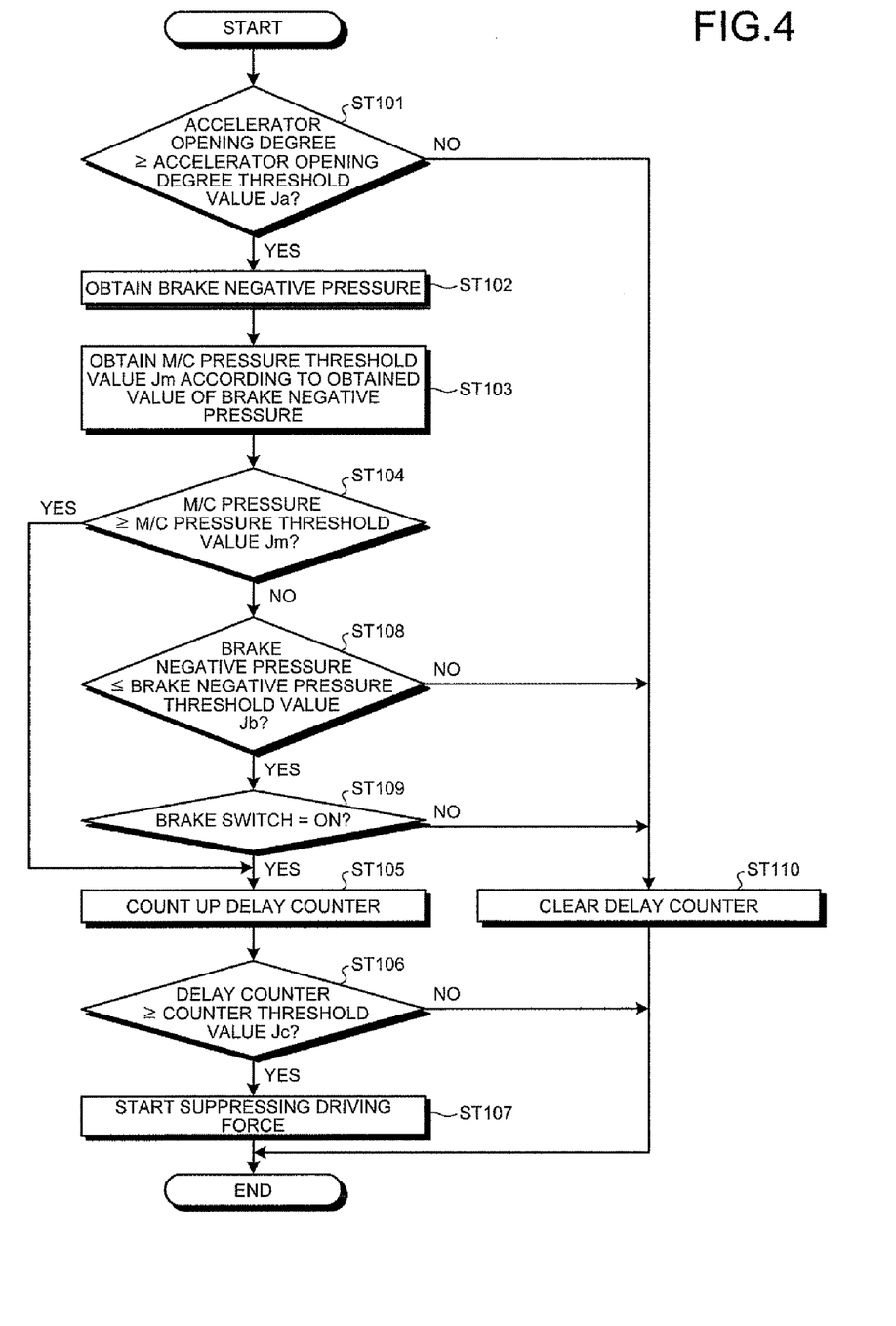
FIG. 4 is a flow diagram illustrating an outline of a procedure of the vehicle control device.

FIG. 4 is a flow diagram illustrating an outline of a procedure of the vehicle control device. Next, the outline of the procedure of the vehicle control device 1 according to this embodiment in a case in which the brake pedal 60 is operated is described. When the operating force is input by the operation of the brake pedal 60, it is first judged whether (accelerator opening degree≥accelerator opening degree threshold value Ja) is satisfied (step ST101). The drive operation judging unit 78 included in the processing unit 72 of the ECU 70 judges this. The accelerator opening degree threshold value Ja used for this judgment is set in advance as a predetermined judgment value used when it is judged whether the state of the drive operation is the state to generate a predetermined or larger driving force by using the accelerator opening degree and is stored in the storage unit 90 of the ECU 70. The drive operation judging unit 78 compares the accelerator opening degree threshold value Ja stored in the storage unit 90 in this manner with the accelerator opening degree obtained by the travel state obtaining unit 74, thereby judging whether (current accelerator opening degree≥accelerator opening degree threshold value Ja) is satisfied.

When it is judged that the accelerator opening degree obtained by the travel state obtaining unit 74 is not lower than the accelerator opening degree threshold value Ja by this judgment (Yes at step ST101), the brake negative pressure is next obtained (step ST102). The travel state obtaining unit 74 included in the processing unit 72 of the ECU 70 obtains a detection result of the negative pressure of the negative pressure path 46 detected by the negative pressure sensor 50 to obtain the brake negative pressure.

Next, an M/C pressure threshold value Jm is determined according to an obtained value of the brake negative pressure (step ST103). The threshold value determining unit 80 included in the processing unit 72 of the ECU 70 determines this. A map indicating a relationship between the booster negative pressure and the M/C pressure threshold value Jm is stored in the storage unit 90 of the ECU 70 and the threshold value determining unit 80 determines the M/C pressure threshold value Jm by checking the brake negative pressure obtained by the travel state obtaining unit 74 against the map.

Figure 5:
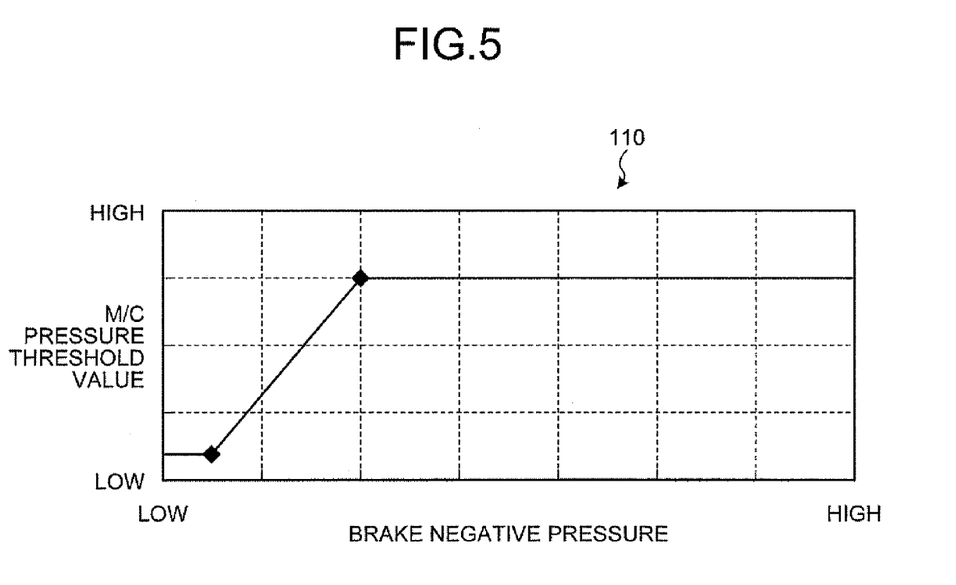
FIG. 5 is an illustrative diagram of a map indicating a relationship between the brake negative pressure and the M/C pressure threshold value.

FIG. 5 is an illustrative diagram of the map indicating the relationship between the brake negative pressure and the M/C pressure threshold value. When an example of a map 110 indicating the relationship between the brake negative pressure and the M/C pressure threshold value Jm is described, the M/C pressure threshold value Jm is a constant value in a region in which the brake negative pressure is not lower than the predetermined value. On the other hand, in a region in which the brake negative pressure is lower than the predetermined value, the M/C pressure threshold value Jm becomes lower as the brake negative pressure decreases. The threshold value determining unit 80 determines the M/C pressure threshold value Jm by checking the brake negative pressure obtained by the travel state obtaining unit 74 against the map 110.

Next, it is judged whether (current M/C pressure≥M/C pressure threshold value Jm) is satisfied (step ST104). The travel state judging unit 82 included in the processing unit 72 of the ECU 70 judges this. The travel state judging unit 82 compares the current M/C pressure obtained by the travel state obtaining unit 74 from a detection result of the master cylinder pressure sensor 54, which detects the M/C pressure, with the M/C pressure threshold value Jm determined by the threshold value determining unit 80, thereby judging whether (current M/C pressure≥M/C pressure threshold value Jm) is satisfied.

When it is judged that the current M/C pressure is not lower than the M/C pressure threshold value Jm by this judgment (Yes at step ST104), next, count up of a delay counter is started (step ST105). The delay counter is provided on the processing unit of the ECU 70 as the counter, which is used for various pieces of control and is controllable by the counter control unit 84. When it is judged that (M/C pressure M/C pressure threshold value Jm) is satisfied, the counter control unit 84 allows the delay counter to operate to count up.

Next, it is judged whether (delay counter counter threshold value Jc) is satisfied (step ST106). The travel state judging unit 82 judges this. The counter threshold value Jc used for this judgment is set in advance as a judgment value used when it is judged whether a state of (M/C pressure≥M/C pressure threshold value Jm) is maintained for a predetermined period of time by using the delay counter and is stored in the storage unit 90. The travel state judging unit 82 judges whether (delay counter≥counter threshold value Jc) is satisfied by comparing the counter threshold value Jc stored in the storage unit 90 in this manner with the delay counter provided on the processing unit 72 to be controlled by the counter control unit 84. When it is judged that the delay counter is smaller than the counter threshold value Jc by this judgment (No at step ST106), the process gets out of the procedure.

On the other hand, when it is judged that the delay counter is not smaller than the counter threshold value Jc (Yes at step ST106), driving force suppression is started (step ST107). The travel control unit 76 performs the driving force suppression. A control value and the map used when the driving force suppression control is performed are set in advance to be stored in the storage unit 90 and the travel control unit 76 decreases the power generated by the engine 10 to suppress the driving force by controlling the operation of the engine 10 based on the control value and the map stored in the storage unit 90 in this manner.

On the other hand, when the travel state judging unit 82 judges that the current M/C pressure is lower than the M/C pressure threshold value Jm (NO at step ST104), the travel state judging unit 82 judges whether (current brake negative pressure≤brake negative pressure threshold value Jb) is satisfied (step ST108). The brake negative pressure threshold value Jb used for this judgment is set in advance as a predetermined judgment value used when it is judged whether the driving force suppression control is performed based on the M/C pressure for the brake negative pressure to be stored in the storage unit 90. The travel state judging unit 82 compares the brake negative pressure threshold value Jb stored in the storage unit 90 in this manner with the brake negative pressure obtained by the travel state obtaining unit 74, thereby judging whether (current brake negative pressure≤brake negative pressure threshold value Jb) is satisfied.

When it is judged that the current brake negative pressure is not higher than the brake negative pressure threshold value Jb by this judgment (Yes at step ST108), the drive operation judging unit 78 judges whether the brake switch 62 is turned ON (step ST109). That is to say, the travel state obtaining unit 74 obtains the state of the brake switch 62 and the drive operation judging unit 78 judges whether the obtained state of the brake switch 62 is ON. When it is judged that the brake switch 62 is turned ON by this judgment (Yes at step ST109), the process shifts to step ST105.

On the other hand, when the travel state judging unit 82 judges that the current brake negative pressure is higher than the brake negative pressure threshold value Jb (No at step ST108), when the drive operation judging unit 78 judges that the brake switch 62 is not turned ON (No at step ST109), or when the drive operation judging unit 78 judges that the accelerator opening degree is smaller than the accelerator opening degree threshold value Ja (No at step ST101), the counter control unit 84 clears the delay counter (step ST110). When the delay counter is cleared in this manner, the process gets out of the procedure.

When the above-described vehicle control device 1 controls to suppress the driving force based on the operation of the brake pedal 60, this suppress the driving force according to the M/C pressure when the brake negative pressure is higher than the brake negative pressure threshold value Jb. When the brake negative pressure is not higher than the brake negative pressure threshold value Jb, this suppresses the driving force according to the operation state of the brake pedal 60 regardless of the M/C pressure by detecting the operation of the brake pedal 60 based on the state of the brake switch 62. According to this, it is possible to prevent judgment that the brake pedal 60 is in a depressed state from being made beyond necessity as in a case in which the operation state of the brake pedal 60 is detected only by the brake switch 62. Also, it is possible to prevent detection of whether the brake pedal 60 is depressed from becoming hard when the brake negative pressure decreases as in a case in which the operation state of the brake pedal 60 is detected only by the M/C pressure. As a result, it is possible to perform untroublesome control for the driver by appropriately controlling when suppressing the driving force based on the operation of the brake pedal 60.

Also, when the driving force is suppressed according to the M/C pressure, the influence degree of he M/C pressure on the suppression of the driving force is changed according to the brake negative pressure by changing the M/C pressure threshold value according to the brake negative pressure, so that it is possible to judge whether the brake pedal 60 is depressed with a high degree of accuracy even when the brake negative pressure changes. As a result, it is possible to more surely detect the operation of the brake pedal 60 with a high degree of accuracy.

Also, it is controlled to suppress the driving force when the accelerator pedal 66, which is operated when the driving force is adjusted, and the brake pedal 60 are operated at the same time, so that it is possible to more surely decelerate with emphasis on the operation of the brake pedal 60 even when the accelerator pedal 66 is depressed. As a result, safety at the time of the vehicle travel may be improved.

Meanwhile, although the above-described vehicle control device 1 changes the M/C pressure threshold value according to the brake negative pressure, when the brake negative pressure becomes equal to or lower than a predetermined brake negative pressure threshold value, it is also, possible to suddenly detect the operation state of the brake pedal 60 by the brake switch 62 without changing the M/C pressure threshold value. It is possible to simplify the control while making the operation of the brake pedal 60 to be appropriately detectable by switching to detect the state of the operation of the brake pedal 60 by the M/C pressure or the brake switch 62 with the brake negative pressure threshold value as a boundary.

Although the above-described vehicle control device 1 detects the brake negative pressure by the negative pressure sensor 50, the brake negative pressure may be obtained by a method other than this. For example, the brake negative pressure may be estimated from the M/C pressure, the intake pipe pressure, and the atmospheric pressure. Although the M/C pressure is detected by the master cylinder pressure sensor 54, the M/C pressure may be obtained by a method other than this. For example, the M/C pressure may be estimated based on a detection result of a sensor, which detects a stroke amount of the master cylinder 42, a stroke amount of a push rod of the brake booster 44, and a stroke amount of the brake pedal 60, and a sensor, which detects the pedal force to the brake pedal 60.

REFERENCE SIGNS LIST 1 vehicle control device
10 engine
30 intake passage
32 exhaust passage
36 throttle valve
40 braking device
42 master cylinder
44 brake booster
46 negative pressure path
48 negative path check valve
50 negative pressure sensor
52 hydraulic pressure path
54 master cylinder pressure sensor
60 brake pedal
62 brake switch
66 accelerator pedal
68 accelerator opening degree sensor
70 ECU
72 processing unit

74 travel state obtaining unit
76 travel control unit
78 drive operation judging unit
80 threshold value determining unit
82 travel state judging unit
84 counter control unit

The invention claimed is:

1. A vehicle control device, that controls to suppress a driving force of a vehicle based on an operation of a brake pedal operated when a braking force is generated by a braking device, wherein
   the brake pedal is connected to a brake servo unit, that increases an operating force input to the brake pedal by using a negative pressure to transmit the operating force to an operating fluid side of the braking device, and
   the driving force is suppressed according to a fluid pressure of the operating fluid when the negative pressure is higher than a predetermined judgment value, and the driving force is suppressed according to an operation state of the brake pedal when the negative pressure is not higher than the judgment value.

2. The vehicle control device according to claim 1, wherein the influence degree of the fluid pressure with respect to the suppression of the driving force is changed according to the negative pressure when the driving force is suppressed according to the fluid pressure.

3. The vehicle control device according to claim 2, wherein the control to suppress the driving force is performed when both an accelerator pedal, operated when the driving force is adjusted, and the brake pedal are operated.

4. The vehicle control device according to claim 1, wherein the control to suppress the driving force is performed when both an accelerator pedal, operated when the driving force is adjusted, and the brake pedal are operated.

* * * * *